United States Patent [19]

Hermann et al.

[11] 4,205,146

[45] May 27, 1980

[54] PROCESS FOR THE PREPARATION OF POLYVINYLBUTYRAL HAVING IMPROVED PROPERTIES

[75] Inventors: Hans D. Hermann, Bad Soden am Taunus; Joachim Ebigt, Frankfurt am Main; Ulrich M. Hutten, Kelkheim, all of Fed. Rep. of Germany

[73] Assignee: Hoechst Aktiengesellschaft, Frankfurt am Main, Fed. Rep. of Germany

[21] Appl. No.: 925,873

[22] Filed: Jul. 18, 1978

[30] Foreign Application Priority Data

Jul. 20, 1977 [DE] Fed. Rep. of Germany ....... 2732717

[51] Int. Cl.$^2$ .............................................. C08F 8/28
[52] U.S. Cl. ................................ 525/61; 260/33.4 R; 260/31.2 R; 428/437; 525/56
[58] Field of Search ............................................. 526/9

[56] References Cited

U.S. PATENT DOCUMENTS 3,153,009  10/1964  Rombach .................................. 526/9

Primary Examiner—Stanford M. Levin
Attorney, Agent, or Firm—Curtis, Morris & Safford

[57] ABSTRACT

The preparation of polyvinylbutyral is commonly effected by the acetalization of polyvinyl alcohol with n-butyraldehyde, either in an organic solvent or in water. By varying the reaction conditions it is possible to obtain the polyvinylbutyral in a coarse-grain or fine-grained form. The production of polyvinylbutyral having improved properties is possible by using a polyvinylbutyral having a content of from 17 to 24% by weight of vinyl alcohol units as starting material for an after-treatment in the presence of an organic sulfonic acid having an emulsifying effect. The polyvinylbutyral obtained is particularly suitable for the manufacture of compound sheets.

8 Claims, No Drawings

PROCESS FOR THE PREPARATION OF POLYVINYLBUTYRAL HAVING IMPROVED PROPERTIES

The present invention relates to a process for the preparation of polyvinylbutyral having improved properties.

It has already been suggested to prepare polyvinylbutyral by acetalization of polyvinyl alcohol with n-butyral. According to one of the processes common in technology, polyvinyl alcohol is dispersed in an organic solvent, for example ethanol, and reacted in the presence of an acid with butyraldehyde. As a result, a solution of high-quality polyvinylbutyral is obtained. However, the drawbacks of this process are to be seen in the complicated isolation of the polymer from the solution and in the recovery of the solvent.

There have therefore been numerous attempts to react polyvinyl alcohol in an aqueous solution to give polyvinylbutyral, in which process the polymer precipitates from the solution and may be separated by filtration. By this process it is difficult to prepare a polymer grain of a high uniformity which can easily be filtered. For example, an aqueous polyvinyl alcohol solution can be reacted at a temperature of from 50° to 100° C. with butyraldehyde in the presence of an acid, with the addition of from 0.04 to 0.2% of an emulsifier after starting the reaction (cf. German Patent Specification No. 1 247 663). In spite of an intensive mechanical agitation of the reaction mixture the polymer is relatively coarse-grained and not uniform, so that the subsequent processing, for example in the presence of plasticizers to give sheets, involves some difficulties.

It has further been suggested to start the acetalization at a temperature of less than 20° C. (cf. German Patent Specification No. 904 592). In the course of this process the polymer precipitates after some time in the form of fine particles. In its further progress, the reaction may be accelerated by an increase in temperature, without changing the favorable filtering properties and the high uniformity of the polymer. However, several properties which are important for the processing of the polymer are unsatisfactory, for example the strength and stickiness.

Finally, there has also been suggested a process for the preparation of polyvinylacetals in which process a polyvinyl alcohol is condensed with an aldehyde in an aqueous phase and in the presence of an acid catalyst (cf. German Offenlegungsschrift No. 2 365 005). In the course of this process the reaction mixture is maintained at a temperature of 20° C. at the most, in order to let the reaction product precipitate, and subsequently the reaction is continued at a temperature of at least 30° C.

The above-mentioned processes are characterized by the common feature that the reaction is discontinued as soon as the desired degree of acetalization is reached. In this process incomplete acetalization is frequently tolerated i.e. the reaction is carried out with an excess amount of butyraldehyde and is discontinued prior to reaching the acetalization equilibrium.

The present invention relates to a process for the preparation of polyvinylbutyral having improved properties and comprises subjecting a polyvinylbutyral having a viscosity of from 10 to 200 cp (measured according to DIN 53 015 at a 5% by weight solution in ethanol at 23° C.) and a content of from 17 to 24% by weight of vinyl alcohol units in an aqueous medium, at a temperature of 50° to 70° C. in the presence of from 0.01 to 5% by weight, calculated on the polyvinylbutyral, of an organic sulfonic acid effective as emulsifier and having from 8 to 30 carbon atoms to an after-treatment for 0.5 to 10 hours under acetalization conditions known per se, and thereafter separating said polyvinylbutyral as usual.

The polyvinylbutyral obtained according to the invention is marked by a considerably increased strength and stiffness and at the same time shows a reduced solubility.

For the process of the invention it is, in principle, insignificant according to which process the polyvinylbutyral employed has been prepared. However, since the after-treatment is effected in an aqueous phase, it is advantageous to use polyvinylbutyrals which have also been prepared in an aqueous phase. For this process it is particularly advantageous to effect the after-treatment immediately and without interruption following the acetalization, so that the acetalization and the after-treatment are carried out in a single operation without separating the acetalization liquor, and the reaction product is subsequently separated in known manner. However, also dry polyvinylbutyral powder may be subjected to the after-treatment of the invention.

The after-treatment of a polyvinylbutyral prepared in an aqueous phase, in whose preparation the reaction temperature has been less than 20° C. up to the completion of the acetalization, is particularly advantageous. This means that in this case the polyvinylbutyral is obtained in a grain size (particle diameter) which is less than 1 millimeter for more than 90%, for the most part even less than 0.5 millimeter, and which is therefore particularly suitable for the after-treatment. In the case of coarser polyvinylbutyral particles it is recommended to grind the particles to the grain size indicated prior to the after-treatment.

The improvement of the mechanical properties depends only to a minor degree on the molecular weight of the polyvinylbutyral employed. It is therefore possible to subject polyvinylbutyrals of a range of molecular weight which is as extensive as is interesting in practice to the after-treatment according to the invention. In this range there are generally polyvinylbutyrals having a viscosity of from 10 to 200 cp, preferably from 50 to 100 cp (measured according to DIN 53 015 at a 5% by weight solution in ethanol at 23° C.).

Of special importance for the success of the process according to the invention is the chemical composition of the polyvinylbutyral. In principle, it is easier to improve the mechanical properties in polyvinylbutyrals which have a high content of vinyl alcohol units than in those having a low content of vinyl alcohol units. If the portion of vinyl alcohol units is less than 17% by weight, a distinct improvement of the mechanical properties can no longer be observed. If the portion is more than 24% by weight, the after-treatment yields a polyvinylbutyral which can no longer be processed satisfactorily. This is why there is used a polyvinylbutyral having a content of from 17 to 24% by weight and preferably from 18 to 23% by weight of vinyl alcohol units.

The mechanical properties of the reaction product are also strongly influenced by the temperature applied in the after-treatment. Temperatures of less than 50° C. are not recommended, since the reaction will take too long in this case. At a temperature of more than 65° C., in the case of high molecular weight polyvinylbutyrals of more than 70° C., the polymer shows a tendency towards a larger grain size and lump formation. The process is therefore carried out generally at a temperature in the range of from 50° to 70° C., preferably 50° to 65° C.

The period of after-treatment is generally in the range of from 0.5 to 10 hours, preferably from 1 to 7 hours.

A particularly important requirement for improving the properties of the polyvinylbutyral by the after-treatment according to the invention is the presence of from 0.01 to 0.5, preferably from 0.05 to 0.2% by weight, calculated on the polyvinylbutyral, of an organic sulfonic acid having from 8 to 30 carbon atoms and being effective as emulsifier. There are suitable for this purpose alkylsulfonic acids and alkylaryl-sulfonic acids, for example dodecylbenzene-sulfonic acid or hexadecane-sulfonic acid. It is also possible to use mixtures of such acids. The aliphatic radical of the sulfonic acids may be branched and the aromatic radical may also be substituted by one or several alkyl groups.

The after-treatment is generally carried out in an aqueous medium under usual acetalization conditions, while using from 1 to 100 parts by weight of water per part by weight of polymer and from about 0.1 to 5% by weight of an inorganic acid, calculated on the aqueous medium. The reaction mixture is normally agitated by stirring. As inorganic acid there is used preferably sulfuric acid or hydrochloric acid. Further it is recommended, in order to maintain the existing degree of acetalization in the polymer, to add n-butyraldehyde in an amount approximately corresponding to the equilibrium concentration, for which purpose from 0.1 to 5% by weight, calculated on the polymer, are sufficient, depending on the reaction conditions. The concentration of n-butyraldehyde is to be chosen in such a manner that the portion of vinyl alcohol units is in the range of from 17 to 24, preferably from 18 to 23% by weight, also in the after-treated polymer.

Due to the described addition of an excess amount of inorganic acid it is not absolutely necessary to employ the organic sulfonic acid having an emulsifying effect as free acid. Rather, use may be made also of any salts of these sulfonic acids, from which the free acid is formed in the reaction mixture.

The after-treatment of the polyvinylbutyral according to the invention is completed by the separtion of the final product. This process is carried out in the same manner as known for the preparation of polyvinylbutyrals from an aqueous medium. The working-up consists in the complete removal of the acid from the polymer, preferably by a thorough washing with water. According to known methods it is recommended to apply a small amount of alkali onto the polymer prior to the subsequent drying, so that from 5 to 100 ml of 0.01 normal HCl solution are required, for example, to neutralize 100 g of polyvinylbutyral.

It is a special advantage of the process of the invention that the properties of the final product can be influenced gradually and in a reproducible manner by varying the individual process features. This is particularly important, since the structure of the polyvinylbutyral employed as starting material may be variable depending on the conditions of its preparation. Polyvinylbutyrals which have been prepared, for example, at a low temperature, have a structure which is as a rule more nearly statistical than that of polyvinylbutyrals obtained at higher temperatures. Therefore it is possible to obtain from the former through an intensive after-treatment a final product of the same quality as that of the latter products which are not modified as strongly by the conditions of the after-treatment.

The manner in which the properties of the polyvinylbutyral are influenced through a modification of the process parameters during the after-treatment according to the invention can be ascertained without difficulty, for example, by determining the viscosity of a 5% ethanolic solution at 23° C. according to DIN 53 015 and observing the viscosity change at this temperature.

For this purpose the polyvinylbutyral is dissolved at 70° C. Subsequently the solution is cooled within 5 minutes to the measuring temperature, and the viscosity is determined immediately. Following definite periods of time, for example after one hour, one day and/or one week each, the viscosity is again determined at 23° C. Those polymers having a portion of vinyl alcohol units of less than 23% by weight which have not been after-treated do practically not show any change of viscosity in this treatment. Polyvinylbutyrals which have been after-treated for only a short time show only a slight thickening in solution, whereas those polyvinylbutyrals which have been after-treated for several hours under more strict conditions, for example at a temperature of more than 65° C. and in the presence of more than 0.2% by weight of alkanesulfonic acid, may thicken in solution already within one hour.

In principle, it is also possible, however, to observe the change of the properties of the polyvinylbutyral by measuring all the other properties that are altered by the after-treatment.

The property changes of the polyvinylbutyral obtained by the process according to the invention are very conspicuous. Especially the strength and the stiffness of the polymer are increased considerably. Plasticized sheets which are prepared from the polyvinylbutyral treated according to the invention show a stiffness that has been markedly increased, a strength that has been considerably increased at a defined elongation, as well as an increased tensile strength with an elongation at tear only slightly reduced, as compared with known polyvinylbutyral sheets. At a temperature of less than 100° C. the sheets manufactured from the polyvinylbutyral prepared according to the invention show a tendency to flowing that has been considerably reduced, which facilitates their use as bonding sheets for safety glass. Further the after-treatment according to the invention surprisingly also strongly reduces the undesired stickiness of the polyvinylbutyral sheets. When using polyvinylbutyral having an appropriate molecular weight distribution, the flow and the processing properties are in no way adversely affected as compared with known polyvinylbutyrals. In spite of the reduced solubility of the polyvinylbutyral in some solvents, which is caused by the after-treatment, said polyvinylbutyral is excellently compatible with common plasticizers and yields sheets having a high transparency.

The processing of the polyvinylbutyral obtained by the after-treatment according to the invention into bonding sheets is carried out in usual manner. As the flow properties in the plasticizer-containing melt are reduced by the after-treatment, it is recommended to employ polymers having a molecular weight — expressed by the viscosity in a 5% ethanolic solution at 23° C. according to DIN No. 53 015—which is generally lower than with the polyvinylbutyrals commonly used for this purpose. In order to further improve the flow properties it is also possible to add polyvinylbutyrals having a lower molecular weight. Finally, the processing properties of the polyvinylbutyral prepared in accordance with the invention may also be influenced by varying the plasticizer added.

The amount of plasticizer to be added is generally in the range of from 20 to 60 parts by weight, especially from 30 to 50 parts by weight for 100 parts by weight of polyvinylbutyral. As plasticizers there are used the compounds that are commonly employed, especially esters of polyhydric alcohols or of polybasic acids. There are suitable, for example, esters of triethylene-glycol with aliphatic carboxylic acids having from 6 to 10 carbon atoms, such as, in particular, 2-ethylbutyric acid, glycerol monooleate, dibutyl sebacate, di($\beta$-butoxymethyl)adipate, dioctylphthalate and tricresyl phosphate. These plasticizers may be used individually or combined.

Furthermore, there may be added a substance which makes the mixture stable to degradation, for example, a small amount of an alkali or a salt having an alkaline reaction, moreover, an oxidation stabilizer, such as a phenol, bisphenol or terpene phenol substituted in the 2, 4 and/or 6 positions.

Finally, the mixtures may also contain an additive which influences the adhesion of the sheets to one another or to glass, for example a salt of a carboxylic acid, a fluoride, lecithin or an alkylene urea.

The above-mentioned stabilizer as well as the additive for influencing the adhesion are usually added in an amount of from 0.001 to 1% by weight, calculated on the total mixture. The polyvinylbutyral, the plasticizer and optionally the additive are mixed in known manner by stirring the components together at normal temperature and optionally leaving the mixture to stand, or by kneading or rolling at an elevated temperature or immediately in the processing stage on a calender or in an extruder.

The manufacture of glass compounds with the aid of bonding sheets containing polyvinylbutyral treated according to the invention may be effected according to conventional methods, for example by molding the sheet between two glass panes at a temperatures of from 120° to 160° C. and a pressure of from 5 to 20 bars. In the manufacture of such compounds above all the low stickiness and the reduced flow properties of the sheets at temperatures of less than 100° C. are advantageous, which particularly facilitates the insertion of the sheets between convex glass panes and also reduces the formation of air-bubbles in the said compounds.

Moreover, the polyvinylbutyrals prepared according to the invention are also suitable for all other application purposes of polyvinylbutyral, for example as additives to lacquers and primers.

The following Examples serve to illustrate the invention.

EXAMPLE 1

270 Grams of a polyvinylbutyral 94% of whose particles were less than 0.5 mm and which had a content of vinyl alcohol units of 20.0% by weight, the 5% ethanolic solution of which had a viscosity of 68 cp at 23° C., were stirred in a mixture of 2,530 g of water, 1 g of n-butyraldehyde, 0.28 g of hexadecane-sulfonic acid and 170 ml of concentrated hydrochloric acid for 5 hours at 60° C. For the working-up, the polymer was filtered off with suction, washed with water until neutral, stirred with 2 l of water and 7 g of 10% sodium hydroxide solution for 1 hour at 60° C., then filtered off with suction and dried at 40° C. in vacuo.

Subsequently the polymer was mixed with 29% by weight of triethylene-glycol-bis(2-ethylbutyric acid ester) and extruded at 170° C. Sheets having a thickness of 0.8 mm were molded from the extruded product. The following Table shows some properties of these sheets as compared with sheets manufactured from the untreated starting polymer.

| polymer | portion of vinyl alcohol units (% b. wt.) | melt-flow index $i_{10}150°$ C.*/ $i_{20}60°$ C.** (g/10 min) (mg/h) | ultimate tensile*** strength (N/cm$^2$) | elongation at break*** | strength at elongation of 100%*** (N/cm$^2$) |
|---|---|---|---|---|---|
| untreated (comparison) | 20.0 | 4.62/134 | 2250 | 325 | 160 |
| treated | 20.4 | 0.82/0 | 2750 | 300 | 450 |

*determination according to DIN 53 735 at 150° C. under a load of 10 kg
**determination of the output in mg/h at 60° C. under a load of 21.6 kg, apparatus as in $i_{10}150°$ C.
***determination according to DIN 53 455 after conditioning at 23° C. and a relative air humidity of 50%, with a tension rate of 20 cm/min, a clamping length of 50 mm, and a width of the measuring tape of 15 mm.

EXAMPLE 2

As described in Example 1, a fine-grained polyvinylbutyral having a portion of vinyl alcohol units of 19.5% by weight, the 5% ethanolic solution of which had a viscosity of 64 cp at 23° C., was stirred in 10 times the amount of water for 3 hours at 62° C. The aqueous mixture contained 2% of sulfuric acid and 0.1% of n-butyraldehyde. Further, 0.2% (calculated on the polymer) of a sodium salt of $C_{13}$–$C_{18}$-alkane-sulfonic acids was added to the reaction mixture. After this treatment the polymer was worked up as indicated in Example 1 and extruded into a sheet containing a plasticizer.

The property changes of the polymer are shown by the following Table.

| polymer | portion of vinyl alcohol units (% b. wt.) | melt-flow index $i_{10}150°$ C./$i_{20}60°$ C. (g/10 min)/(mg/h) | ultimate tensile strength* (N/cm$^2$) | blocking*** (sec) |
|---|---|---|---|---|
| untreated (comparison) | 19.5 | 7.15/175 | 1,900 | 7,000 |
| treated | 20.7 | 2.00/0 | 2,800 | 1,200 |

*cf. Example 1
**The determination of the sheet adhesion which is termed "blocking" in the Table was effected as follows:

Strips of plastic sheet of 15 × 100 mm having a definitely roughened surface were put on top of one another at a length of 5 cm after conditioning at 23° C. and at a relative air humidity of 50%, and then charged with a load of 1 N/cm$^2$. Subsequently the said strips were hung up under normal climatic conditions and pulled apart with a weight of 200 g. The period until the strips of sheet separated from one another was determined in seconds.

According to known methods, glass compounds having a high impact strength and an excellent transparency could be made from sheets produced from the polymer thus treated.

EXAMPLE 3

100 Parts each of a polyvinylbutyral having a 93% portion of particles whose diameter was less than 1 mm and having a content of vinyl alcohol units of 21.5% by weight were stirred in a mixture of 900 parts of 2.5% hydrochloric acid, 2 parts of n-butyraldehyde and 0.2 part of dodecylbenzene-sulfonic acid for 6 hours each time at the temperatures indicated in the Table below and were then worked up as described in Example 1.

Of the polymers whose granular structure has remained unchanged, 5% solutions in ethanol were prepared each time at 70° C. After cooling to 23° C., the viscosity of the solutions was determined according to DIN 53 015. The results are shown in the following Table.

| treatment temperature (°C.) | viscosity, 5% in ethanol at 23° C. (cp) | |
|---|---|---|
| | after 5 minutes | after 24 hours |
| 51 | 60 | 66 |
| 55 | 63 | 72 |
| 60 | 68 | 98 |
| 64 | 80 | 174 |

As compared with the above polymer compositions, the solution of the untreated polymer had a viscosity of 55 cp 5 minutes after cooling and of 56 cp 24 hours after cooling

EXAMPLE 4

A polymer having the properties indicated in the following Table was treated as described in Example 3, with the difference that 0.4% by weight of dodecylbenzene-sulfonic acid was present (calculated on the polymer). The reaction temperature was 65° C. The working-up was effected as described in Example 1.

| polymer | portion of vinyl alcohol units (% by weight) | viscosity, 5% in ethanol at 23° C. | | melt-flow index (without plasticizer) $i_{10}$190° C. (g/10 min)) |
|---|---|---|---|---|
| | | after 5 min | after 24 hours (cp) | |
| untreated (comparison) | 22.5 | 24 | 24 | more than 50* |
| treated | 22.7 | 215 | more than 15,000 | 5.2 |

*not measurable more precisely

EXAMPLE 5

1,000 Parts of a 10% solution of polyvinyl alcohol (polymerization degree about 1,200) were reacted in known manner in the presence of 65 parts of concentrated hydrochloric acid at 15° C. with n-butyraldehyde. 15 Parts of butyraldehyde were introduced at first, while stirring, and subsequently another 42 parts of butyraldehyde were added within 10 minutes. In the course of this process the polyvinylbutyral being formed precipitated in a fine-grained form. The mixture was then heated, while stirring, to 40° C. at a rate of 15° C. per hour and was maintained for 4 hours at this temperature. Subsequently the mixture was divided. One half was worked up according to the method described in Example 1 (comparison test).

The other half of the mixture was mixed with 0.15 part of $C_{13}$-$C_{18}$-alkane-sulfonic acids in 5 parts of water and heated to 62° within 10 minutes. After 1, 3 and 5 hours of reacting at 62° C. each time, samples were taken, and after 7 hours the reaction was discontinued. All samples and the remainder of the reaction mixture were worked up as in Example 1.

Several properties of the polymers have been summarized in the following Table.

| reaction period at 62° C. (hours) | portion of vinyl alcohol units (% b. wt.) | viscosity, 5% in ethanol, 23° C. | | melt-flow index $i_{10}$150° C. (g/10 min.) | blocking*** (sec) | properties of a 0.76 mm sheet (29% of plasticizer content*) elongation under*** 37N/cm² of charge after 100 min (%) |
|---|---|---|---|---|---|---|
| | | after 5 min. (cp) | after 24 hours (cp) | | | |
| (comparison) | 21.6 | 54 | 55 | 7.21 | 5000 | 127 |
| 1 | 21.4 | 55 | 59 | 6.56 | 1600 | 41 |
| 3 | 21.2 | 59 | 68 | 2.74 | 1300 | 32 |
| 5 | 21.0 | 70 | 83 | 1.26 | 950 | 26 |
| 7 | 20.9 | 83 | 120 | 0.52 | 550 | 25 |

*triethylene-glycol-bis-ester of a $C_6$—$C_9$-fatty acid mixture
**cf. Example 2
***The measuring was effected at strips of plastic sheet of 15 × 100 mm, to which a corresponding weight was hung. It demonstrates the increase in stiffness of the sheet due to the after-treatment according to the invention.

EXAMPLE 6

A polymer prepared according to the state of the art as indicated in Example 5, which had a portion of vinyl alcohol units of 19.7% by weight and a grain size of less than 0.5 mm of 96%, the viscosity of the 5% ethanolic solution being 81 cp, was stirred each time in the presence of 8 times the amount of 1.8% hydrochloric acid and in the presence of 2.5%, calculated on the polymer, of n-bujtyraldehyde for 7 hours at 55° C. The amount of dodecylbenzene-sulfonic acid indicated in the following Table was added each time to the corresponding batches. The change of some properties is shown in said Table as compared with the untreated starting product.

| polymer | addition of dodecyl-benzene-sulfonic acid (%, calculated on the polymer) | portion of vinyl alcohol units (% b. wt.) | properties of a 0.76 mm sheet (29% of plasticizer content) | |
|---|---|---|---|---|
| | | | melt-flow index $i_2 60°$ C. (mg/hour) | strength at an elongation of 100% (Example 1) (N/cm$^2$) |
| untreated (comparison) | — | 19.7 | 175 | 150 |
| treated | 0.05 | 19.5 | 10 | 280 |
| treated | 0.1 | 19.7 | 4 | 320 |
| treated | 0.3 | 19.3 | 0 | 350 |

*triethylene-glycol-bis(2-ethylbutyric acid ester)

EXAMPLE 7

In a manner analogous to that described in Example 5, various polyvinylbutyrals were prepared and after-treated in a single operation by way of the process according to the invention.

1,250 Parts each of a 8% solution of polyvinyl alcohol were cooled together with 85 parts of concentrated hydrochloric acid and 15 parts of n-butyraldehyde to 13° C. The mixtures contained 0.3 parts of octadecane-sulfonic acid. Subsequently 40, 44 and 48 parts, respectively, of n-butyraldehyde were added dropwise within 30 minutes at 13° C. to three different batches. Thereafter the batches were heated to 63° C. within 2 hours at a constant rate and were maintained for 5 hours at this temperature. Already when reaching a temperature of 55° C., the desired range of the acetalization degree was reached. In the case of one of the batches, a sample was taken at this point, which sample showed the properties of a polymer according to the state of the art, as was to be expected.

In contradistinction thereto, an intensification of the intermolecular forces was found in the polymers which had been treated for a prolonged period of time according to the invention, as shown by the following Table.

| polymer | portion of vinyl alcohol units (% b. wt.) | viscosity, 5% in ethanol, 23° C. | | properties of a 0.76 mm sheet (29% of plasticizer content*) | |
|---|---|---|---|---|---|
| | | after 5 min (cp) | after 24 hours (cp) | tensile strength (N/cm$^2$) | blocking (sec) |
| 1 after-treated | 18.9 | 53 | 62 | 2500 | 1800 |
| 2 after-treated | 20.2 | 61 | 91 | 2750 | 900 |
| 2 comparison | 19.2 | 52 | 52 | 2100 | 7500 |
| 3 after-treated | 22.2 | 69 | 109 | 2800 | 420 |

*triethylene-glycol-bis(2-ethylbutyric acid ester)

What is claimed is:

1. Process for the preparation of a polyvinylbutyral having improved properties, which comprises subjecting a polyvinylbutyral having a viscosity of from 10 to 200 cp (measured according to DIN 53 015 at a 5% by weight solution in ethanol at 23° C.) and a content of from 17 to 24% by weight of vinyl alcohol units in an aqueous medium, at a temperature of from 50° to 70° C. in the presence of from 0.01 to 0.5% by weight, calculated on the polyvinylbutyral, of an organic sulfonic acid having from 8 to 30 carbon atoms and being effective as emulsifier to an acetalizing after-treatment for a period of from 0.5 to 10 hours in the presence of from 1 to 100 parts by weight of water per part of polyvinylbutyral and from 0.1 to 5% by weight of inorganic acid, calculated on the aqueous medium, and thereafter recovering the after-treated polyvinylbutyral.

2. Process as claimed in claim 1, which comprises using a polyvinylbutyral having a viscosity of from 50 to 100 cp (measured according to DIN 53 015 at a 5% by weight solution in ethanol at 23° C.)

3. Process as claimed in claim 1, which comprises using a polyvinylbutyral having a content of from 18 to 23% by weight of vinyl alcohol units.

4. Process as claimed in claim 1, which comprises heating the polyvinylbutyral in an aqueous medium to 50 to 65° C.

5. Process as claimed in claim 1, which comprises subjecting the polyvinylbutyral to an after-treatment for a period of from 1 to 7 hours.

6. Process as claimed in claim 1, which comprises using the organic sulfonic acid in an amount of from 0.05 to 0.2% by weight, calculated on the polyvinylbutyral.

7. A process as claimed in claim 1 wherein the after-treatment is applied to the polyvinylbutyral immediately after it has been initially prepared and without separating it from the original acetalization liquor in which it was prepared.

8. A process according to claim 1 wherein from 0.1 to 5% by weight of n-butyraldehyde is incorporated in the reaction medium.

* * * * *